(12) United States Patent
Yousaf

(10) Patent No.: US 10,944,635 B2
(45) Date of Patent: Mar. 9, 2021

(54) MLA BASED DISTRIBUTED MANAGEMENT AND ORCHESTRATION (MANO) SYSTEM AND METHOD

(71) Applicant: NEC Laboratories Europe GmbH, Heidelberg (DE)

(72) Inventor: Faqir Zarrar Yousaf, Leimen (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/609,747

(22) PCT Filed: May 3, 2018

(86) PCT No.: PCT/EP2018/061426
§ 371 (c)(1),
(2) Date: Oct. 31, 2019

(87) PCT Pub. No.: WO2018/202814
PCT Pub. Date: Nov. 8, 2018

(65) Prior Publication Data
US 2020/0067782 A1    Feb. 27, 2020

(30) Foreign Application Priority Data

May 3, 2017    (EP) ..................................... 17169268

(51) Int. Cl.
*H04L 12/24*    (2006.01)
*G06F 9/50*    (2006.01)
*G06F 9/455*    (2018.01)

(52) U.S. Cl.
CPC ...... *H04L 41/0896* (2013.01); *G06F 9/45558* (2013.01); *G06F 9/5077* (2013.01);
(Continued)

(58) Field of Classification Search
CPC ............. H04L 41/0896; H04L 41/0893; H04L 41/5051; H04L 41/12; G06F 9/45558;
(Continued)

(56) References Cited

U.S. PATENT DOCUMENTS

2016/0359682 A1    12/2016  Senarath et al.
2017/0331759 A1*   11/2017  Li ....................... H04L 41/5054
(Continued)

FOREIGN PATENT DOCUMENTS

WO    WO 2016/117694 A1    7/2016

OTHER PUBLICATIONS

IPCOM000246625D, "Dynamic Network Function Virtualization Management Systems and Methods", Jun. 22, 2016, IP.com, p. 1-11, total 11 pages. (Year: 2016).*
(Continued)

*Primary Examiner* — Gil H. Lee
*Assistant Examiner* — Chhian (Amy) Ling
(74) *Attorney, Agent, or Firm* — Leydig, Voit & Mayer, Ltd.

(57) ABSTRACT

A method for operating a data communication network having a Network Function Virtualization Infrastructure (NFVI) includes: by a Cloud Service Provider (CSP), providing a centralized Management and Orchestration (MANO) system that manages the NFVI and that orchestrates the allocation of resources needed by Network Services (NSs) and/or Virtualized Network Functions (VNFs) configured in the network. The method further includes: by the centralized MANO system and upon request from a tenant, allocating resources of the NFVI to the tenant and providing the tenant its own MANO instance for being employed by the tenant to control and manage its own service and/or network slices and/or implement its own policies independently from the centralized MANO frame-
(Continued)

work provided by the CSP. Management Level Agreements (MLAs) negotiated between the CSP and the tenant determine the scope of the tenant's autonomy over the tenant's MANO instance.

15 Claims, 7 Drawing Sheets

(52) U.S. Cl.
CPC ...... *H04L 41/0893* (2013.01); *H04L 41/5051* (2013.01); *G06F 2009/4557* (2013.01); *G06F 2009/45595* (2013.01)

(58) Field of Classification Search
CPC .......... G06F 9/5077; G06F 2009/4557; G06F 2009/45595
See application file for complete search history.

(56) References Cited

U.S. PATENT DOCUMENTS

| | | | |
|---|---|---|---|
| 2018/0018192 A1 | 1/2018 | Gokurakuji et al. | |
| 2018/0084427 A1* | 3/2018 | Huo | H04L 63/20 |
| 2018/0241635 A1* | 8/2018 | Rao | H04L 41/0816 |
| 2019/0109768 A1* | 4/2019 | Senarath | H04L 41/0681 |
| 2020/0021487 A1* | 1/2020 | Yao | H04L 41/04 |
| 2020/0084091 A1* | 3/2020 | Iovene | H04L 41/082 |

OTHER PUBLICATIONS

Mayoral et al., "Multi-tenant 5G Network Slicing with Dynamic Deployment of Virtualized Tenant MANO Instances", 42nd European Conference and Exhibition on Optical Communications, Sep. 18-22, 2016, p. 509-511, total 3 pages. (Year: 2016).*
Mayoral A et al: "Cascading of tenant SDN and cloud controllers for 5G network slicing using transport API openstack API", 2017 Optical Fiber Communications Conference and Exhibition (OFC), OSA, Mar. 19, 2017 (Mar. 19, 2017), pp. 1-3, XP033100823.
Anonymous, "Network Functions Virtualisation (NFV); Management and Orchestration; Functional Requirements Specification," ETSI GS NFV-IFA 010 v.2.1.1, Apr. 1, 2016, pp. 1-60, XP055473986.
European Telecommunications Standards Inistitute (etsi), "Network Functions Virtualisation (NFV); Management and Orchestration," ETSI GS NFV-MAN 001 v1.1.1, Dec. 1, 2014, pp. 1-184, XP055366912.

* cited by examiner

MLA BASED DISTRIBUTED MANAGEMENT AND ORCHESTRATION (MANO) SYSTEM AND METHOD

CROSS-REFERENCE TO RELATED APPLICATIONS

This application is a U.S. National Phase application under 35 U.S.C. § 371 of International Application No. PCT/EP2018/061426, filed on May 3, 2018 and hereby incorporated by reference herein, and claims the benefit of European Patent Application No. EP 17169268.4, filed on May 3, 2017. The International Application was published in English on Nov. 8, 2018 as WO 2018/202814 under PCT Article 21(2).

FIELD

The present invention relates to a method for operating a data communication network having a Network Function Virtualization Infrastructure, NFVI, wherein a centralized Management and Orchestration, MANO, system is provided by a Cloud Service Provider, CSP, wherein the MANO system manages the NFVI and orchestrates the allocation of resources needed by Network Services, NSs, and/or Virtualized Network Functions, VNFs, configured in the network.

BACKGROUND

The ETSI ISG NFV (European Telecommunications Standards Institute Industry Specification Group) has proposed a management and orchestration framework, called NFV-MANO, for the management and orchestration of NFV resources (both physical and virtual), where the resources can be infrastructure resources (e.g., compute, network, memory, storage) and/or service resources (e.g., network services like vEPC, virtual Evolved Packet Core). The infrastructure resources belong to the NFV infrastructure (NFVI) such as compute, network, memory, storage, etc., whereas the service resources can be VMs (Virtual Machines) or Virtualized Network Functions (VNF) or, more complex, a Network Service (NS) that is composed of several different types of VNFs interconnected by Virtual Links, VL, and characterized by a VNF Forwarding Graph (VNFFG). A vEPC is an example of a complex NS that is composed of several VNFs and VNF Components (VNFC).

Some terms that are frequently employed in the present description are used in accordance with the meanings given in the following list of abbreviations:

| | |
|---|---|
| CSP | Cloud Service Provider |
| FCAPS | Fault, Configuration, Accounting, Performance, Security |
| LCM | Lifecycle Management |
| MLA | Management Level Agreement |
| MS | Management Service |
| NFV | Network Function Virtualization |
| NFVI | Network Function Virtualization Infrastructure |
| NFVI-PoP | NFVI Point of Presence |
| NFVO | NFV Orchestrator |
| NS | Network Service |
| rSlice | Resource Slice |
| sSlice | Service Slice |
| t-MANO | Tenant MANO |
| t-NFVO | Tenant NFVO |
| t-VIM | Tenant VIM |
| t-VNFM | Tenant VNFM |
| VAFD | VAF Descriptor |
| VIM | Virtualized Infrastructure Manager |
| VL | Virtual Link |
| VMF | Virtualized Management Function |
| VMFC | VMF Component |
| VNF | Virtualized Network Function |
| VNFC | VNF Component |
| VNFFG | VNF Forwarding Graph |
| VNFFGD | VNFFG Descriptor |

FIG. 1 shows the architecture of the NFV-MANO framework, as specified by the ETSI (for reference, see ETSI NFV ISG, GS NFV-MAN 001 V1.1.1 *Network Function Virtualisation (NFV); Management and Orchestration*, December 2014). The ETSI ISG NFV is specifying the functional MANO functional blocks, the interfaces/operations on its different reference points and also its various resource/service catalogues.

SUMMARY

In an embodiment, the present invention provides a method for operating a data communication network having a Network Function Virtualization Infrastructure (NFVI). The method includes: by a Cloud Service Provider (CSP), providing a centralized Management and Orchestration (MANO) system that manages the NFVI and that orchestrates the allocation of resources needed by Network Services (NSs) and/or Virtualized Network Functions (VNFs) configured in the network. The method further includes: by the centralized MANO system and upon request from a tenant, allocating resources of the NFVI to the tenant and providing the tenant its own MANO instance for being employed by the tenant to control and manage its own service and/or network slices and/or implement its own policies independently from the centralized MANO framework provided by the CSP. Management Level Agreements (MLAs) negotiated between the CSP and the tenant determine the scope of the tenant's autonomy over the tenant's MANO instance.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
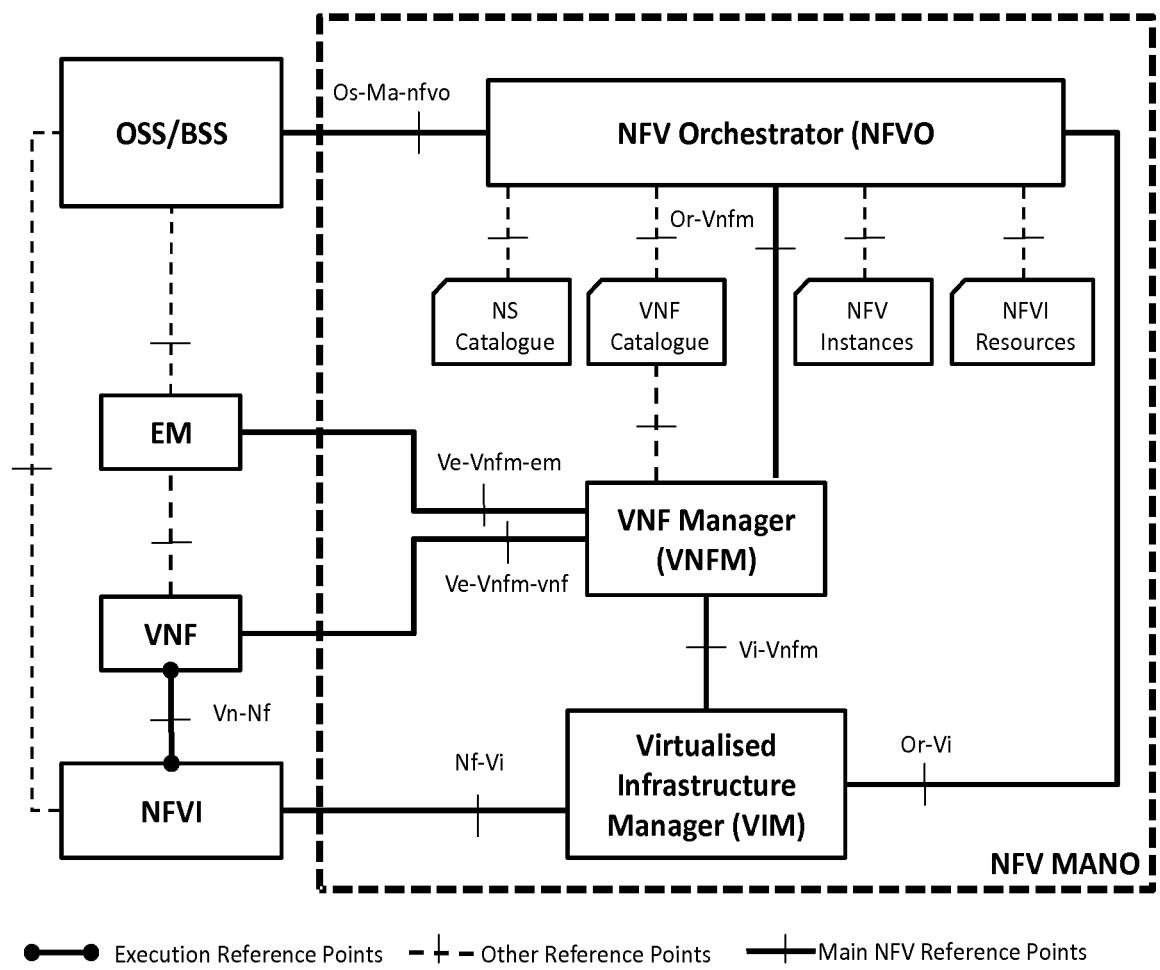
FIG. 1 is a schematic view illustrating the general architecture of the NFV Management and Orchestration (MANO) framework.

Referring to FIG. 1, theoretically, the operator NFVI (such as a DC, Data Center) can support multiple tenants, such as MVNOs (Mobile Virtual Network Operators), where each tenant (or customer) is allocated a quota of resources specific to the tenant service needs/requirements. The tenants can then instantiate and offer multiple service instances (e.g., multiple NSs) to its external customers within its allotted quota of resources. As part of its service, the NFVI-owner (referred to as operator in the text unless mentioned otherwise) provides the MANO services/functions to the various NSs belonging to different tenants.

The problem to providing MANO services to various tenants is that effectively a single MANO framework instance is being shared amongst multiple tenants, and this can cause performance issues ranging from delayed response (in providing management and/or orchestration services to individual tenants and/or to their respective resource/service instances) to posing as a single-point-of-failure. Besides scalability and reliability issues, such a centralized MANO architecture prevents the tenants from implementing own policies and/or rolling out new services or managing existing services without involving the centralized MANO-system provided by the operator (hereinafter briefly referred to as c-MANO). Moreover, having to rely on the centralized c-MANO will have delay issues in cases where the tenant services are running on remote sites (such as micro datacenters) or edge domains with real time service management requirements.

A solution to the above problem would be to provide each tenant an own virtualized tenant MANO instance, as proposed by A. Mayoralm et al. (A. Mayoralm, R. Vilalta R. Casellas, R. Martinez, R. Muñoz, *Multi-tenant 5G Network Slicing Architecture with Dynamic Deployment of Virtualized Tenant Management and Orchestration (MANO) Instances*, in Proceedings of 42nd European Conference on Optical Communication (ECOC) 2016). However, the main issue with this approach and other related work is that each tenant will get unprecedented (i.e., full) access to the control and management of the infrastructure resources of the CSP, which may not be desired by the CSP itself. In such a case, each tenant will effectively have full admin privileges of their respective resources that may then interfere with the other tenants sharing the same NFVI. This may itself be counter-productive as it may then involve the c-MANO instance to validate and orchestrate every decision of the tenant MANO instance to ensure against any decision that may violate the service requirements of other tenants. Moreover, the CSP may not desire to provide each tenant with full management control of its assets (allotted or otherwise).

In an embodiment, the present invention provides a method for operating a data communication network having a Network Function Virtualization Infrastructure, NFVI. The method includes providing, by a Cloud Service Provider, CSP, a centralized Management and Orchestration, MANO, system that manages the NFVI and that orchestrates the allocation of resources needed by Network Services, NSs, and/or Virtualized Network Functions, VNFs, configured in the network, or managing the NS and/or VNF instances themselves. The method further includes allocating, by the centralized MANO system, upon request from a tenant, resources of the NFVI to the tenant and providing the tenant its own MANO instance for being employed by the tenant to control and manage its own resources and/or services and/or network slices and/or implement its own policies independently from the centralized MANO framework provided by the CSP. The scope of the tenant's autonomy over the tenant's MANO instance is determined by Service Level Agreements, SLAs (or, using a different notation, by Management Level Agreements, MLAs), negotiated between the CSP and the tenant. An SLA or MLA (denoting an agreement that is like an SLA but at a management level) should be understood to encompass the rights and privileges negotiated between the tenants and the Cloud Service Provider, CSP, that determine the scope of the services/features/capabilities of the centralized MANO system that the tenants are allowed to access/use/execute via their own MANO instance. Basically, in the context of the present description, the term MLA can be regarded as being used synonymous with the term SLA.

In view of the issues and problems of having to rely on a centralized MANO (c-MANO) as highlighted above, embodiments of the present invention relate to a method/system that will enable each tenant of a cloud infrastructure to have their own MANO stack i.e., tenant MANO (t-MANO) stack, enabling them with the required autonomy that is granted and managed by the c-MANO to manage and orchestrate their own resources/services/policies without having to rely on the c-MANO system provided by the CSP. Consequently, embodiments of the invention provide a framework where the tenants are provided limited and/or controlled privileges to their respective MANO stack (i.e., t-MANO), while the CSP is able to monitor and police the tenants for the usage of their respective MANO stacks as per agreed MLA. In other words, embodiments of the invention relate to a method/system that will provide the tenants of a cloud service provider with the ability to control and manage their own service/resource slice(s) without having to fully rely or depend on the central management and orchestration (MANO) system provided by the cloud service provider for implementing and managing own policies, resource and service slices.

In an embodiment of the invention, tenants in turn also have the ability to further lease out resource slices (rSlice) and/or service slices (sSlice) and thus provide t-MANO stacks recursively, i.e. the t-MANO stacks have the provision to support recursive provisioning of t-MANO stacks to its respective tenants. In other words, this embodiment relates to a method of providing MLA-bound MANOaaS (MANO as a service) to various tenants with the added feature of the tenants to further provide MANOaaS recursively to its respective tenants.

Furthermore, embodiments of the invention provide the inherent ability against fault/failure of the MANO system. This is achieved by providing MANO system features/capabilities as a service to the tenants, i.e., MANOaaS.

In an embodiment, the present invention provides a method and system that enables a CSP to dynamically provide and manage an MLA-bound MANO stack to its individual tenants in order for them (i.e., the Tenants) to manage & orchestrate their respective resource slice(s), rSlice, and service slice(s), sSlice, within the bounds specified in the MLA, where the method/system introduces to the cloud management system (e.g., NFV MANO system) two new catalogues to the c-MANO system, namely a t-MANO Catalogue and a VMF catalogue for enabling the invention, wherein the VMF Catalogue maintains a VMF descriptor (VMFD) file, which is a volatile/mutable data-structure/database that maintains and manage the state information and MLA information of the t-MANO instance. It shall enable the CSP (via the c-MANO system) to monitor, manage and track any changes in the t-MANO system state and/or MLA between the CSP and the Tenant, or between a Tenant with its own respective tenants. Furthermore, an additional capability is enabled according to which recursive provisioning and management of t-MANO stacks by a tenant to its respective customer(s)/tenant(s) via its own t-MANO stack and MLA negotiated within the specified bounds is supported.

While embodiments of the present invention are generally applicable to any cloud management system, hereinafter, the invention and its embodiments will mainly be described with reference to the NFV-MANO system architecture, as proposed by the ETSI ISG NFV (for reference, see ETSI NFV ISG, *GS NFV-MAN 001 V1.1.1 Network Function Virtualisation (NFV); Management and Orchestration*, December 2014). Therefore, for the ease of understanding of the present invention it is beneficial to first consider the existing NFV-MANO system architecture before describing embodiments of the present invention in greater detail below.

Figure 5:
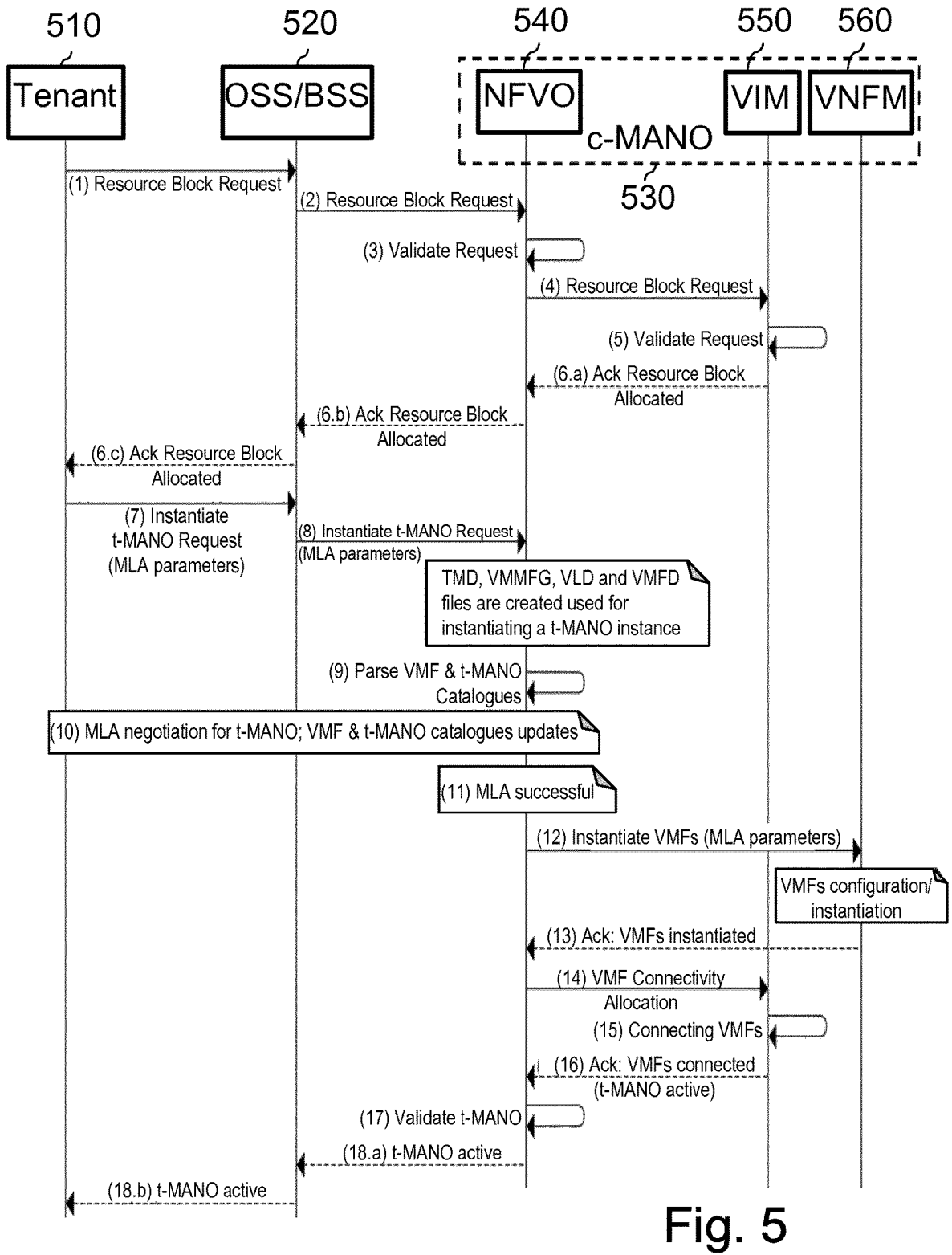
FIG. 5 is a message sequence diagram illustrating message exchange between the relevant entities in the context of a t-MANO stack instantiation process according to an embodiment of the present invention.

An overview of the NFV-MANO system architecture as proposed by the ETSI ISG NFV is depicted in FIG. 1 (corresponding to FIG. 5.1 of the above cited document). The following are the three main functional blocks of the NFV-MANO system:
1) Virtualized Infrastructure Manager (VIM)—for the management of NFV Infrastructure (NFVI) resources like compute, network, storage, memory etc.
2) Virtualized Network Function Manager (VNFM)—for the FCAPS management and lifecycle management (LCM) of VNF(s) that are deployed and instantiated over the NFVI
3) NFV Orchestrator (NFVO)—for the service and resource management and orchestration of the network services (NS) that are formed by chaining various VNFs, linking them via Virtual Links, and characterized by the VNF Forwarding Graph (VNFFG).

In addition to these functional blocks there are various catalogues that contain descriptions for the VNFs (i.e., VNFD), NS (i.e., NSD) and other descriptor files.

The three functional blocks interact with each other using standard interfaces over the relevant reference points in order to provide FCAPS (Fault, Configuration, Account, Performance, Security) and Lifecycle Management (LCM) of virtualized resources and services belonging to different tenants. The MANO system allocates resources, deploy and instantiate the Virtualized Network Functions (VNF) and/or Network Services (NS) over the NFVI as per the tenant(s) request and requirements. A NS is composed of one or more VNFs interconnected via Virtual Links (VL) in order to provide an end-to-end service to the tenants' customer. There could be multiple tenants in an NFVI (i.e., Datacenter) and each tenant may have one or more NS that needs to be managed. As part of the LCM tasks, the MANO system has the capability to instantiate, migrate, scale-in/out/up/down, update/upgrade, and delete VNF/NS instances. In addition the MANO system can also orchestrate network resources and NS on need basis or as and when required.

Considering the potentially large numbers of VNF/NS instances belonging to different tenants with unique and varying policies and service/resource requirements, managing their services and orchestrating their resources with a centralized MANO system (hereinafter briefly denoted c-MANO) can potentially become a performance bottleneck as described already above.

Moreover, the performance issues can become complex in case the tenant services span across multiple NFVI-PoPs and/or across different administrative domains. ETSI NFV has proposed some architectural extensions in [3] that proposes distributing some MANO functional blocks (e.g., VIM and VNFM) in different domains under a single NFVO, or each NFVI-PoP having a dedicated MANO system coordinated by an umbrella NFVO (for reference, see ETSI NFV ISG, "GS NFV-IFA 009 V1.1.1 Network Functions Virtualisation (NFV); Management and Orchestration; Report on Architectural Options", July 2016). In effect all these extensions still propose a centralized MANO system, at least at the NFVI-PoP level, and the multiple tenants are still sharing the features/services/capabilities of the c-MANO system within the same NFVI-PoP. In case of an umbrella NFVO overarching over different NVFI-PoPs, it still risks as a single-point-of-failure that has the potential of impacting NS that spans across different NFVI-PoPs.

In contrast, embodiments of the present invention relate to a method where each tenant is provided its own MLA-bound MANO stack, which is referred to herein as tenant MANO (or briefly t-MANO). According to embodiments the t-MANO may have the added feature to support recursive provisioning of MLA-bound t-MANO instances to its own tenants respectively. In cloud terms, the tenants are said to be provided MANOaaS. Conceptually the t-MANO is an image of the c-MANO that is deployed and instantiated for each tenant. The t-MANO will provide either a full or partial set of the features/capabilities/services of the c-MANO depending on the MLA negotiated between the tenant and the MANO provider. This enables the tenants to exercise management and orchestration functions over its respective resource slices (rSlice) and service slices (sSlice) via the t-MANO stack with minimum dependence/reliance on the c-MANO stack. However, in accordance with embodiments, the c-MANO will have full administrative rights over the respective tenants' t-MANO system stack, where it will monitor the t-MANO for MLA compliance and provide services/features/capabilities to the tenants that are outside the MLA bounds, and under specific situations override/modify the t-MANO's decision on actions.

Figure 2:
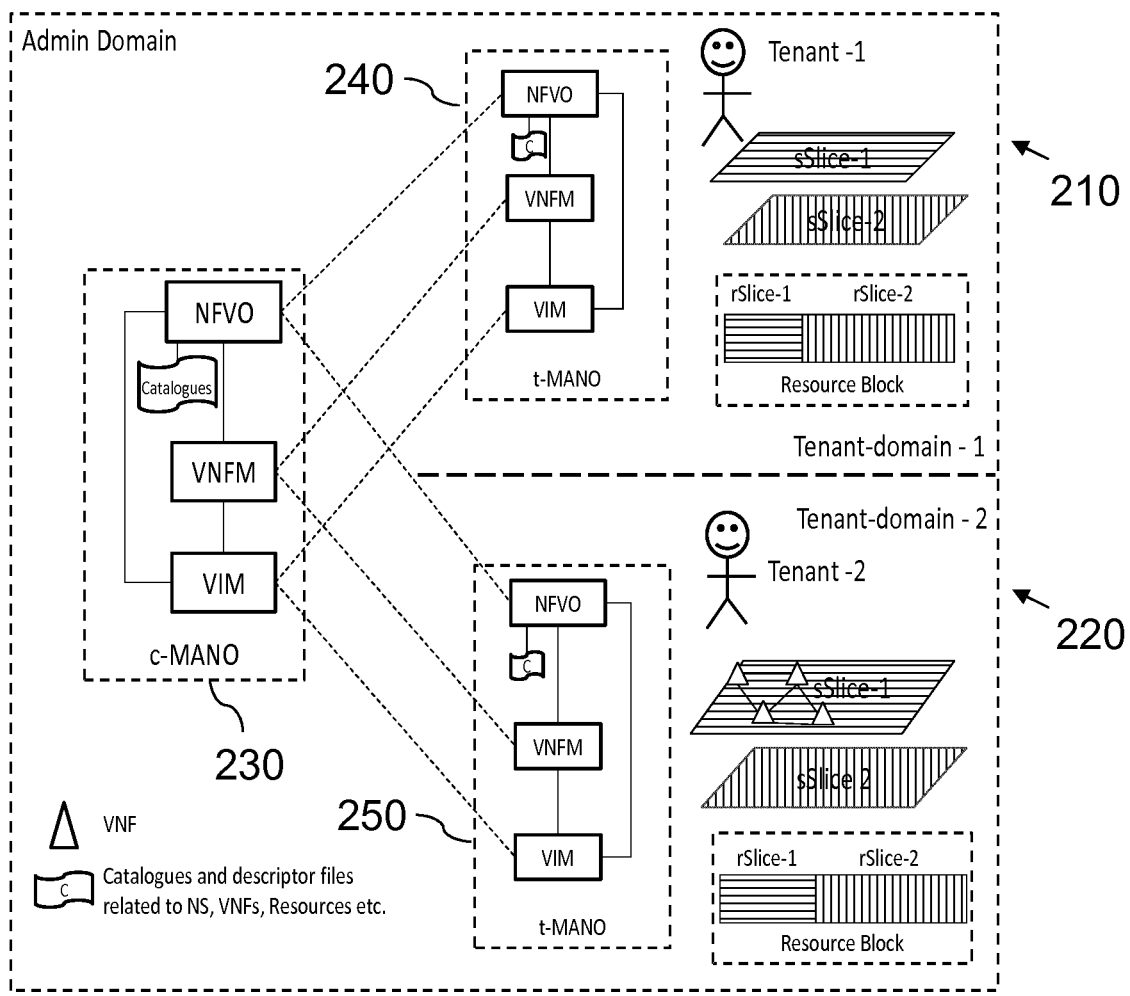
FIG. 2 is a schematic view illustrating a conceptual overview of MANOaaS (MANO as a Service) in accordance with embodiments of the present invention.

FIG. 2 shows the conceptual overview of the concept of embodiments of the proposed invention. Two independent tenants i.e., Tenant-1 (T1), shown at 210, and Tenant-2 (T2), shown at 220, logically define two independent administrative domains and they may be within the same NFVI-PoP or they may be in different NFVI-PoPs. For the sake of simplicity, it is assumed that the NFVI-PoPs are owned by the same CSP, and that they are in the same NFVI-PoP. Based on their service requirements, T1 and T2 will request for NFVI resource blocks of specific flavor (i.e., type and amount of specific resources such as compute, network, memory, storage, etc.) from the cloud service provider (CSP). It is further assumed that the CSP is also the owner of the NFVI and the MANO stack 230 (i.e., owner of the c-MANO). The tenants will then request for the provisioning of t-MANO system stack in their respective domains, the operational/functional scope of which is negotiated between the tenants and the CSP. This MLA negotiation shall mainly involve what functional elements and which services/features/capabilities of the t-MANO system the tenant will have access rights to and the access levels. The tenants can request from the CSP for resource blocks and t-MANO stacks via the OSS/BSS or via some other portal that provides a GUI for making requests and negotiating the relevant MLAs.

Once the t-MANO system stacks (shown at 240 and at 250, respectively) are deployed and instantiated for the respective tenants, they will be able to dimension (or slice) their respective allocated resource block into resource slices (rSlice) and then create, deploy, configure and instantiate their own sSlice(s) (i.e., NS instance(s)) without involving the CSP or the c-MANO 230. In other words, each of the tenants T1 and T2 will have autonomy in performing FCAPS management and LCM operations and orchestration actions over its respective resource/service slice(s), and for implementing own policies without involving the c-MANO 230, whereas the degree of autonomy over the respective t-MANO stack instance 240, 250 will depend on the agreed MLA with the CSP, which will be monitored, policed/enforced by the c-MANO.

It is important to mention here that the flexibility and agility features of an NFV system will also allow the recursive leasing out of its NFVI resources. For example, a tenant of the CSP (that may be regarded as 'first-level' tenant) will be able to further distribute/lease portion out of its allotted resource quota to other tenants (that may be regarded as 'second-level' tenants). In such a situation the first-level tenant will become the CSP for the second-level tenant, and hence this recursive relationship can be further expanded. In such a situation, and depending on the MLA agreement between the c-MANO and t-MANO, the t-MANO system owned by the first-level tenant will have the feature/capability to instantiate a t-MANO system for the second-level tenant.

It should be noted that in terms of NFV terminology a service slice, sSlice, is the same as a NS. Typically a NS is characterized by a VNFFG that specifies the type of VNF(s) and the order of their interconnectivity over virtual links (VL). With a similar concept, the c-MANO 230 deploys and instantiates a t-MANO system stack 240, 250 as it would a NS, but in this case the t-MANO service instance 240, 250 is composed of Virtualized Management Function (VMF) instead of VNFs, and these VMF instances (i.e., VIM, VNFM and/or NFVO) are linked over VLs within the tenant domain. As mentioned before, the c-MANO 230 will still maintain administrative and management control of the t-MANO service instances 240, 250 and they are logically connected. This logical connection between the c-MANO 230 and the t-MANO service instances 240, 250 is depicted as dotted lines in FIG. 2. This peer relationship between the functional elements/blocks of the c-MANO 230 and t-MANO stacks 240, 250 enables the c-MANO 230 to monitor/police the t-MANO instance(s) 240, 250 for MLA compliance and to extend services/features/capabilities to the tenants that are outside the MLA bounds of the tenants' respective t-MANO instance(s) 240, 250. Moreover, the c-MANO 230 can always override/modify any management/orchestration decision on action and/or when the t-MANO 240, 250 is found violating the MLA. For this purpose, the t-MANO service instances 240, 250 can send a record of its MANO decisions on actions to the c-MANO 230, either before or after the execution depending on the MLA. In case of pre-execution reporting, it is considered as a permission of the t-MANO 240, 250 from the c-MANO 230 to execute a specific management action, which the c-MANO 230 can permit, deny or modify. In case of post-execution reporting, the c-MANO 230 can override or modify the previous action decided/executed by any of the t-MANO instances 240, 250.

Notion of MLA—Example Use Case

As an example of MLA based operation of the t-MANO stacks, a tenant T1 is assumed to have negotiated a Gold-level MLA, while another tenant T2 has negotiated a Silver-level MLA for their respective t-MANO stacks. The Gold-level allows T1 the capability to migrate a NS or any VNF instance of a NS to another location, either within the same NFVI-PoP or a different NFVI-PoP. The Silver-level only allows the tenant to add/scale VNFs to an existing sSlice.

In case tenant T1 wants to add a latency sensitive real-time VNF to an existing sSlice, T1 will not only be able to add the new VNF to its sSlice, but it will also be able to migrate the sSlice from its present location to a location that is near to T1's core resources. T1 is able to achieve this by utilizing the functional/operational capabilities of its t-MANO stack without involving the c-MANO. T1 is pleased with the result and the CSP is also pleased that no coordination on project planning was needed to satisfy T1.

On the other hand for the same scenario, tenant T2 will have the privilege to add the real-time VNF to an existing sSlice within its tenant-domain using the capabilities of its t-MANO stack and without involving the c-MANO and CSP. However, for the migration decision T2 will specifically send a request to the c-MANO via its t-MANO. The migration decision will then be explicitly dictated by the c-MANO and executed either by the c-MANO itself or through the t-MANO.

Deployment of t-MANO Stack

Hereinafter, embodiments of the present invention will be described with a focus on how the t-MANO stack instance can be realized, deployed and provisioned to the different tenants by leveraging the existing virtualization and/or container techniques and without requiring any architectural extension to the existing standardized NFV-MANO system that is illustrated in FIG. 1. Specifically, the following two embodiments will be described in some more detail:

1) The t-MANO stack is realized as a virtualized function, similar to a VNF, and which is referred to as a Virtualized MANO Function (VMF).
2) The t-MANO stack is realized as a container.

Regardless of the two embodiments, the c-MANO can be realized either on a dedicated server, or as a VMF or on a container. What is important is that the t-MANO instances maintain peer relationship with the c-MANO stack, either over an IP-based network or via some RPC-based method.

Figure 3:
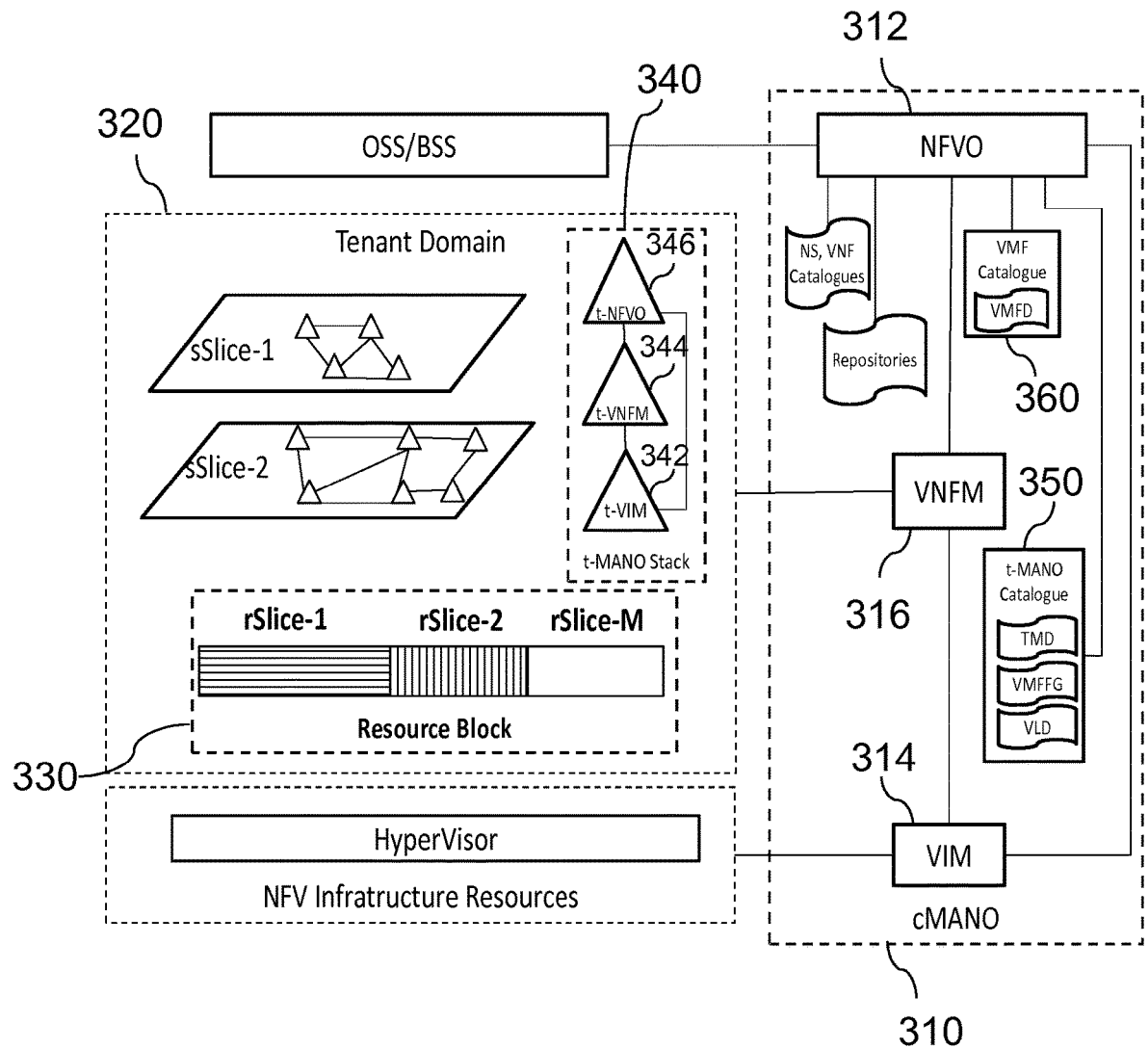
FIG. 3 is a schematic view illustrating the deployment and provisioning of a t-MANO instance as a VNF in accordance with an embodiment of the present invention, FIG. 4 describes a process for the instantiation of t-MANO services for a tenant according to an embodiment of the present invention.

The above mentioned first embodiment of the invention is depicted in FIG. 3. For the sake of simplicity and clarity, only a single Tenant domain will be considered. However, as will be easily appreciated by those skilled in the art, the invention can be applied likewise to more than one Tenant domain.

The right side of FIG. 3 shows a c-MANO 310 which is the standard NFV-MANO system with relevant reference points between its functional blocks. The said tenant 320 has been allocated a quota of NFVI resource block 330 by the c-MANO 310 using the NFV-MANO standard method. It is also assumed that the required VNF packages and relevant catalogues (e.g., VNF descriptor files (VNFD), NS Descriptor files (NSD) etc.) are also on-boarded by the tenant 320 to the c-MANO 310 using standard on-boarding technique.

The tenant 320 will then request for the provisioning of a t-MANO stack. The c-MANO 310 will then deploy, instantiate, connect and configure the different VMF Components (i.e., t-VIM 342, t-VNFM 344, t-NFVO 346) to create a t-MANO stack instance 340 in almost a similar manner as it would deploy, instantiate, connect and configure VNFs and/or its components forming a NS. In case the t-NFVO, t-VNFM and the t-VIM components of the t-MANO system are on-boarded as separate VMF component (VMFC), then in that case a VMF Forwarding Graph (VMFFG) and VMF descriptor file (VMFD) needs to be present in order to describe the interconnectivity between the three essential t-MANO functional blocks.

With this requirement, embodiments of the invention propose the following two new catalogues, namely
1) A t-MANO catalogue 350 consisting of the following descriptor files
   a. the t-MANO descriptor file (TMD),
   b. VMF Forwarding Graph (VMFFG), and
   c. The Virtual Link Descriptor (VLD).
2) A VMF catalogue 360 consisting of the VMF descriptor (VMFD) file.

The information provided by the t-MANO catalogue 350 and VMF catalogue 360 is used by the c-MANO 310 for the deployment and instantiation of the t-MANO 340 in a manner that is similar to the deployment and instantiation of the VNF and NS using the VNF/NS catalogue. In case of the described embodiment, however, a VMF (i.e., Virtualized Management Function) and MS (i.e., Management Service) are deployed instead of a VNF (i.e., Virtualized Network Function) and NS (i.e., Network Service).

The information inside the TMD file of the t-MANO catalogue 350 is used by the NFVO 312, VIM 314 and the VNFM 316 of the c-MANO system 310 to instantiate a t-MANO instance 340 for the tenant 320, which consists of the mainly three VMF instances (i.e., t-NFVO 342, t-VNFM 344 and t-VIM 346) interconnected by VLs, whereby the characteristics of the VLs are described by the VLD of the t-MANO catalogue 350. The VMFFG, similar to VNFFG, contains metadata about the VMF Forwarding Graph itself, references to VLs, VMFs, connection points etc. The TMD, VMFFG and VLD are quite similar to function as NSD, VNFFG and VLD, but they contain necessary extensions that are relevant and unique to the t-MANO requirements. The details on NSD, VNFFG and VLD are provided in the document ETSI NFV ISG, *GS NFV-MAN 001 V1.1.1 Network Function Virtualisation (NFV); Management and Orchestration*, December 2014, in document ETSI NFV ISG, *GS NFV-IFA 011 V2.1.1 Network Functions Virtualisation (NFV); Management and Orchestration; VNF Packaging Specification*, October 2016, as well as in document ETSI NFV ISG, *GS NFV-IFA 014 V2.1.1 Network Functions Virtualisation (NFV); Management and Orchestration; Network Service Templates Specification*, October 2016. Anyone skilled in the art can extend these descriptor files to include the deployment template and service requirements unique to the t-MANO.

There can be situations where the tenant may request only partial VMFs. For example, a tenant may request for the provisioning of only a VNFM and a VIM functional blocks for its t-MANO stack. In this case the t-MANO will rely on the NFVO component of the c-MANO for resource/service slice management and orchestration. In the above example, it is assumed that the tenant 320 requests for the complete t-MANO stack 340. The VLs between the t-MANO VMFs will support the standard NFV-MANO reference points and the interfaces and operations defined over them. However, there may be some interfaces and/or operations that the t-MANO instance 340 may not be allowed to access due to MLA restrictions. For such restrictions, the t-MANO 340 may execute such operations via the c-MANO stack 310, as described in the use case example stated above.

Although not shown in FIG. 3, the tenants may also maintain own VNF/NS catalogues and repositories as part of their t-MANO service instance. However, these catalogues and repositories must be first validated by the c-MANO before they are assigned to the t-MANO system.

The VMFD, similar to a VNFD (as described in ETSI NFV ISG, *GS NFV-IFA 011 V2.1.1 Network Functions Virtualisation (NFV); Management and Orchestration; VNF Packaging Specification*, October 2016) is a deployment template which describes the relevant VMF blocks of the t-MANO stack in terms of deployment, operational and functional behavior requirements. It also contains interface, connectivity and KPI requirements of the respective VMF blocks. In addition, it also specifies the services, features and capabilities of the respective VMF blocks and includes information on the access rights of the Tenant to the various service/features/capabilities of the respective VMFs. In other words, the VMFD also embeds the MLA negotiated between the tenant and the CSP, which specifies which services/features/capabilities of the t-MANO system a tenant is allowed access to. It shall also contain policies that are relevant for the respective VMFs. Thus, the VMFD files are updated at the time of MLA negotiation with agreed MLA parameters. The VMFD can be updated at run-time each time the c-MANO modifies/updates any of its MLA parameter, or each time the MLA is (re)negotiated. An MLA is re-negotiated, for example, each time the Tenant creates a new sSlice. Thus a t-MANO instance can be configured to have different MLA for different sSlices belonging to the same Tenant. This dynamic composition of the VMFD differentiates it from the VNFD, which is static. Table 1 provides an example of a non-exhaustive list of some of the MLA parameters that can be negotiated for a t-MANO instance.

TABLE 1

Example of MLA parameters

| Primary Key | Secondary Key | Value (information element) | Type | Cardinality | Description |
| --- | --- | --- | --- | --- | --- |
| t-MANO_id | ns_id | tenant_id | int | 1 | The tenant id to which the t-MANO belongs |
| | | tnfvo-id | int | 0 . . . 1 | The id of the t-NFVO component of the t-MANO stack. |
| | | tvnfm-id | int | 0 . . . 1 | The id of the t-VNFM component of the t-MANO stack. |

TABLE 1-continued

Example of MLA parameters

| Primary Key | Secondary Key | Value (information element) | Type | Cardinality | Description |
|---|---|---|---|---|---|
| | | tvim-id | int | 0 . . . 1 | The id of the t-VIM component of the t-MANO stack. |
| | | time_to_live | int | 1 | The duration of the t-MANO instance |
| | | resource_flavor | User defined | 1 | The resources (type & amount) for t-MANO instance |
| | | resource_id_list | list | 1 | The list of resources and amount assigned for t-MANO |
| | | domain_id | Int | 1 | The domain where t-MANO instance is deployed |
| | | do_auto_scaling | boolean | 1 | Permission to perform scaling operations |
| | | do_auto_healing | boolean | 1 | Permission to perform healing operations |
| | | do_migration | boolean | 1 | Permission to perform migration operations |
| | | do_update | boolean | 1 | Permission to perform update operations on VNFs/VNFCs |
| | | Vmffg | User defined | 1 | Pointer to VMFFG |
| | | scale_policy | User defined | 0 . . . 1 | Scaling policy |
| | | migration_policy | User defined | 0 . . . 1 | Migration policy |
| | | healing_policy | User defined | 0 . . . 1 | Healing policy |
| | | mano_event_list | User defined | 1 | List of events executed by t-MANO |
| | | allow recursion | boolean | 1 | Permission for a t-MANO stack to instantiate further t-MANO stacks, i.e., recursively. |
| | | t-mano_instance_list | Pointer list | 0 . . . 1 | The list of t-MANO instances recursively instantiated |
| | | t-mano-state-info | User defined | 1 | Carries state information of the t-MANO system |

The above Table 1 hints at a multi-key map based data structure where the Primary Key is the id of the t-MANO stack instance and the Secondary key is the id of the NS that is under the management and orchestration of the t-MANO instance. The value field indicates the necessary information elements and MLA parameters indicating the permissions granted to the t-MANO instance in terms of accessing specific MANO service/feature/capabilities over a specific NS. Thus a single t-MANO instance can manage multiple NS instances belonging to the same tenant. The added feature of this approach is that a separate MLA can be negotiated for each NS instance (i.e., sSlice) that the tenant instantiates within its domain. Moreover, this sort of a data-structure allows for a single tenant to negotiate and instantiate multiple t-MANO stack instances for a sub-set of its sSlices. This also allows for identifying the location of the t-MANO instances in a multi-tenant/multi-site environment. As an added embodiment, separate MLA parameters can be negotiated for each respective t-MANO functional blocks. For example, the tenant can negotiate separate MLA for the NFVO, VNFM, and VIM components of the t-MANO stack. Anyone skilled in the art will be able to design a data structure for such a case or extend the one shown in Table 1.

With the help of the t-MANO Catalogue and VMF Catalogue, once the c-MANO deploys and instantiates the t-MANO stack for a requesting tenant, the tenant can then further dimension the allocated resource block of NFVI resources (compute, network, memory, storage, etc.) into resource slices (rSlice) depending on the requirements of the tenant's service slices (sSlice). In FIG. 3, the allocated NFVI resource block is dimensioned into three resource slices namely rSlice-1, rSlice-2 and rSlice-M. The rSlice-1 is for sSlice-1 and rSlice-2 is for sSlice-2. rSlice-M is dedicated to provide the resources required by the t-MANO stack 340. Once the rSlices are created, the t-MANO 340 can then deploy and instantiate the sSlices using the standard NFV-MANO method. Once the sSlices are deployed, configured and instantiated, the t-MANO 340 can then perform regular LCM operations within the MLA bounds on the resource/service slices within its tenant-domain 320, and involving the c-MANO 310 for operations that the t-MANO 340 is not permitted to execute without c-MANO's explicit permission or directly involving c-MANO for execution.

An additional feature of embodiments of the present invention is the inherent ability of recursive provisioning of MANO stacks by the tenants themselves. This is a situation where the tenant further leases out its rSlices to other tenants (i.e., Second level tenant), and then the tenant can provision t-MANO stack for those Second-level tenants provided they have the permission to do so as indicated by the boolean value "allow_recursion" in Table 1. In such a situation the t-MANO instance can serve as a c-MANO for the Second-level tenants.

Figure 4:
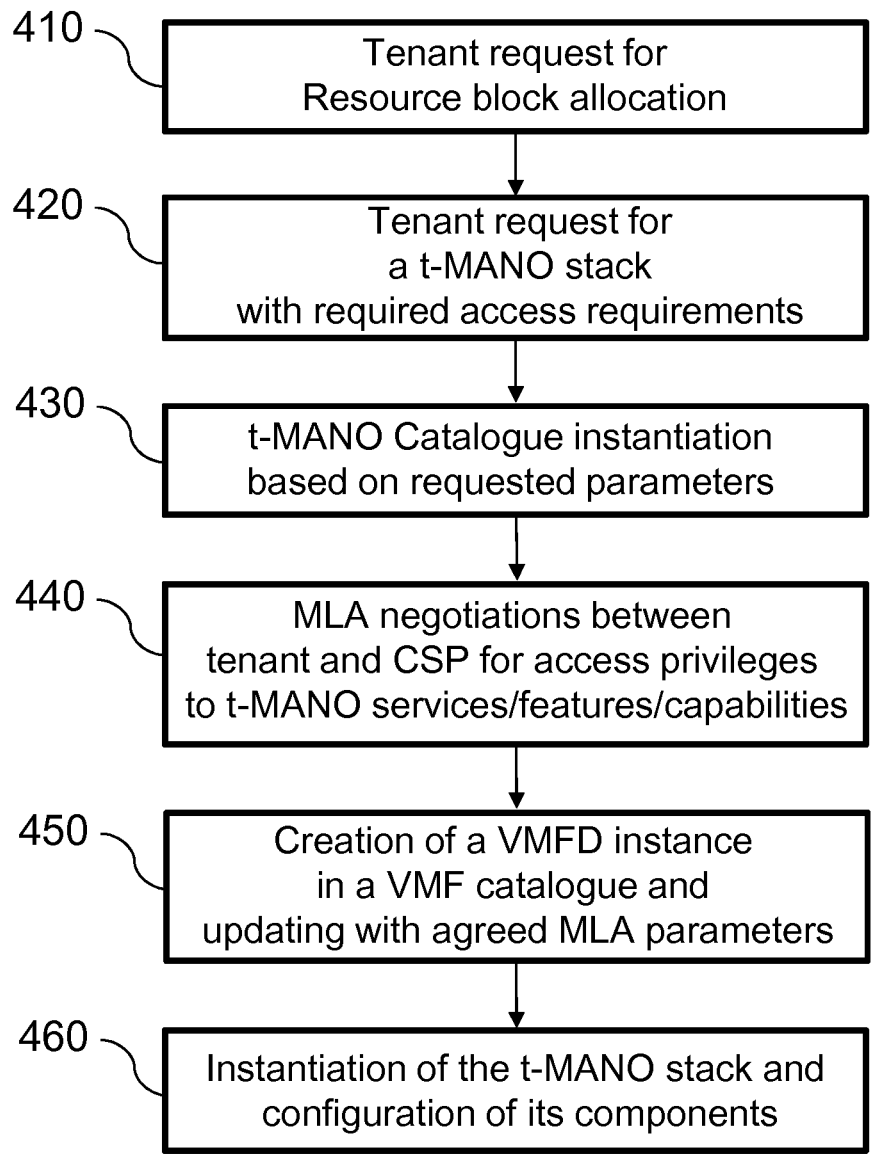

FIG. 4 illustrates a process overview of deployment and instantiation of a t-MANO stack for a tenant in accordance with an embodiment of the present invention in which the t-MANO stack is deployed as a service within the tenant's virtualized domain. The process involves the following main steps:

At 410, the tenant requests the CSP for the allocation of a NFVI resource block. In an embodiment, the tenant specifies within the request the resource type (e.g., compute, network, storage, memory, etc.) and a desired capacity of each resource type. The flavor of the resource block is based on the tenant's service requirements.

At 420, the tenant then requests the CSP for the provisioning of the t-MANO stack indicating the required VMF components (VMFC) such as NFVO, VNFM, VIM and specifying required privileges to access specific MANO services/features/capabilities that the tenant requires from the t-MANO stack.

At 430, the CSP creates a t-MANO Catalogue based on the parameters indicated in the request.

At 440, an MLA negotiation process is executed between the tenant and the CSP (i.e., the c-MANO provider) in order to agree on the scope of the tenant's autonomy to access MANO services/features/capabilities that the tenant is allowed to execute independently using its t-MANO instance within its domain.

At 450, a VMFD instance is created, which is updated with the MLA parameters agreed between the tenant and the CSP. The VMFD is maintained inside a VMF Catalogue. In this context, it should be noted that the above Table 1 is an example embodiment of such a VMFD.

At 460, the CSP, with the help of c-MANO system, will instantiate the t-MANO stack and configure its relevant management components (i.e., t-NFVO, t-VIM, t-VNFM) as per the agreed MLAs indicated inside the VMFD.

The t-MANO stack is now ready to be used by the tenant for creating own rSlices over which sSlices can be instantiated that are then managed and orchestrated by the t-MANO stack within the negotiated MLA.

According to an embodiment, a method is provided for providing each Tenant its own MANO system stack (i.e., t-MANO), the method comprising in accordance with FIG. 4:

1) Availability of a c-MANO system with an effective monitoring system within the CSP infrastructure;
2) A tenant requesting, via some interface e.g., GUI, for specific NFVI resource block (e.g., compute, network, memory, storage) from the CSP and the provisioning of such resources to the Tenant;
3) Tenant requesting for the provisioning of a t-MANO system stack specifying the services/features/capabilities that it requires;
4) Instantiation of a t-MANO Catalogue (including TMD, VMFFG and VLD files) based on which the t-MANO stack will be deployed and instantiated;
5) Instantiation of a VMFD file for the newly instantiated t-MANO system that will maintain the state and the MLA parameters for the t-MANO stack instance;
6) An MLA negotiation between the Tenant and the CSP will take place in order to agree on the scope of the Tenant's access to MANO services/features/capabilities. The MLA parameters and the t-MANO state information will be maintained and managed inside the VMFD file.
7) After the MLAs are agreed the t-MANO stack will be configured via the c-MANO and ready to be used by the Tenant;
8) The c-MANO system monitoring and policing the usage of the t-MANO stack for compliance with the MLA.

t-MANO Instantiation Process—Example

An overview of a process for instantiating a t-MANO stack over an NFVI platform for a tenant in accordance with an embodiment of the present invention is illustrated in FIG. 5 as a message sequence diagram, where messages are numbered for clarity during process description. It is assumed that a Tenant 510 requests for the provisioning of NFVI resource block and t-MANO stack via the OSS/BSS 520, which is then processed by the functional blocks of a c-MANO system 530. In the illustrated embodiment, the functional blocks include the NFVO 540, VNFM 550 and VIM 560.

In FIG. 5, message flows indicated by messages (1) through (6) are related to the request and allocation of the NFVI resource block. The flavor of the resource block is specified by the Tenant 510 as part of the request for resource block (message (1)).

After the resource block has been assigned and allocated, which is indicated to the Tenant 510 by means of 'Ack: Resource Block Allocated' message (6), the Tenant 510 requests for the instantiation of the t-MANO stack in its tenant-domain via the OSS/BSS 520, see message (7) in FIG. 5. The request message (7) is configured to also carry the MLA parameters specifying the access privileges/permissions for the MANO service/feature/capabilities that the Tenant 510 desires for accessing and executing for the requested t-MANO stack. Corresponding TMD, VMFFG, VLD and VMFD files will be initialized/created within the relevant catalogues (i.e., TMD, VMFFG and VLD within the t-MANO catalogue, and a VMFD file within the VMF catalogue). The files are maintained by the NFVO functional block 540 of the c-MANO 530. The NFVO 540 will parse these files to verify that all relevant VMF packages and descriptor files determine the requirements (e.g., resource requirements, connectivity requirements) and the requested features/services/capabilities of the requested t-MANO stack instance, see message (9) of FIG. 5.

After all the packages and descriptor files have been verified and parsed, the NFVO 540 and the Tenant 510 will undergo a process negotiating the MLA based on what the Tenant 510 desires and what the CSP can provide, see message (10). It is noted that as the MLA is negotiated, the respective VMF descriptor (VMFD) file will be dynamically updated.

After the MLA has been successfully negotiated, see item (11) in FIG. 5, the NFVO 540 sends a request to the VNFM 560, see message (12), to start the process of instantiating the VMF instances (i.e., t-NFVO, t-VNFM, t-VIM) for the t-MANO stack. Upon receipt of the request, the VNFM 560 performs a process of instantiating and configuring the VMF blocks/components, which will be described in greater detail below in connection with FIG. 6.

The VNFM 560 informs the NFVO 540 about successful VMF instantiation and configuration by means of a 'Ack: VMFs instantiated' message (13). Upon receipt of this message, the NFVO 540 instructs the VIM 550 to establish connectivity between the t-MANO VMF components in order to realize the respective reference points. This is shown as messages (14) and (15) in FIG. 5.

After the VIM 550 has established connectivity it will send an acknowledgement to the NFVO 540 that the t-MANO instance is active, see message (16) in FIG. 5. The NFVO 540, after validating the acknowledgement and running some integrity tests on the newly instantiated t-MANO stack at (17), informs the Tenant 510 via the OSS/BSS 520 that the requested t-MANO is active and is ready for use by the Tenant 510, see message (18) in FIG. 5). The Tenant 510 can now use the t-MANO stack for creating, managing and orchestrating its own resource/service slices and policies within the bounds of agreed MLA.

VMF Components Instantiation Process—Example

As part of the process of instantiating a t-MANO stack described above in connection with the embodiment of FIG. 5, each individual VMF component of the t-MANO stack (e.g., t-NFVO, t-VNFM, t-VIM) needs to be separately instantiated and configured before they are connected. With reference to FIG. 5, the NFVO 540 sends a request to the VNFM 560 for instantiating the VMF components, see message (12) of FIG. 5. In accordance with an embodiment of the present invention, FIG. 6 provides an example overview of the VMF instantiation/configuration process as a message sequence diagram, where like reference numerals denote like components as in FIG. 5.

Figure 6:
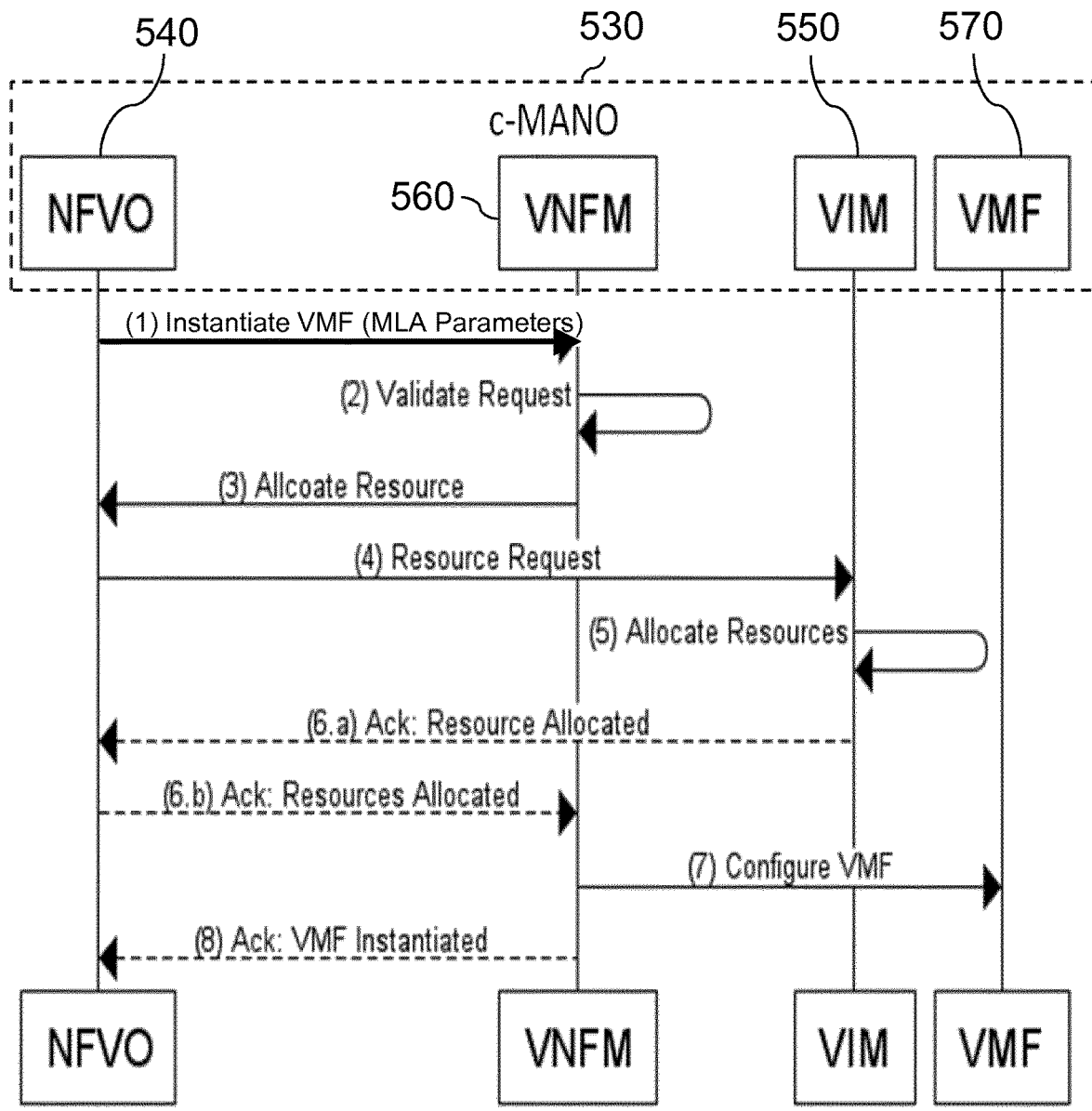
FIG. 6 is a message sequence diagram illustrating message exchange between the relevant entities in the context of a VMF instantiation process according to an embodiment of the present invention.

The VNFM 560 receives the VMF Instantiation request from the NFVO 540 together with the negotiated MLA parameter(s), see message (12) in FIG. 5 and message (1) in FIG. 6. The VNFM 560, after validating the request (see message (2) of FIG. 6), sends a message to NFVO 540 to get allocated requisite resources for the requested VMF component type, see message (3). The NFVO 540 forwards this request for VMF resource allocation to the VIM 550, see message (4), that will reserve and allocate necessary resources from the resource block within the Tenant domain for the requested VMF instance, see message (5). The VIM 550 then sends a confirmation to the NFVO 540, see message (6.*a*), which will then acknowledge the resource allocation to the VNFM 560, see message (6.*b*).

Once the VMF 570 has been deployed, the VNFM 560 will configure the newly deployed VMF 570 in the tenant domain with necessary configuration parameters specified in the VMFD file and on the MLA basis, see message (7). Once the VMF 570 is configured, the VNFM 560 will inform the NFVO 540 that the requested VMF 570 has been instantiated and configured, see message (8). It should be noted that this process of VMF instantiation will be repeated for each different type of VMF component belonging to the t-MANO stack i.e., t-NFVO, t-VNFM and t-VIM. Once configured, they will be interconnected and the t-MANO stack will be provisioned as described above in connection with FIG. 5.

Figure 7:
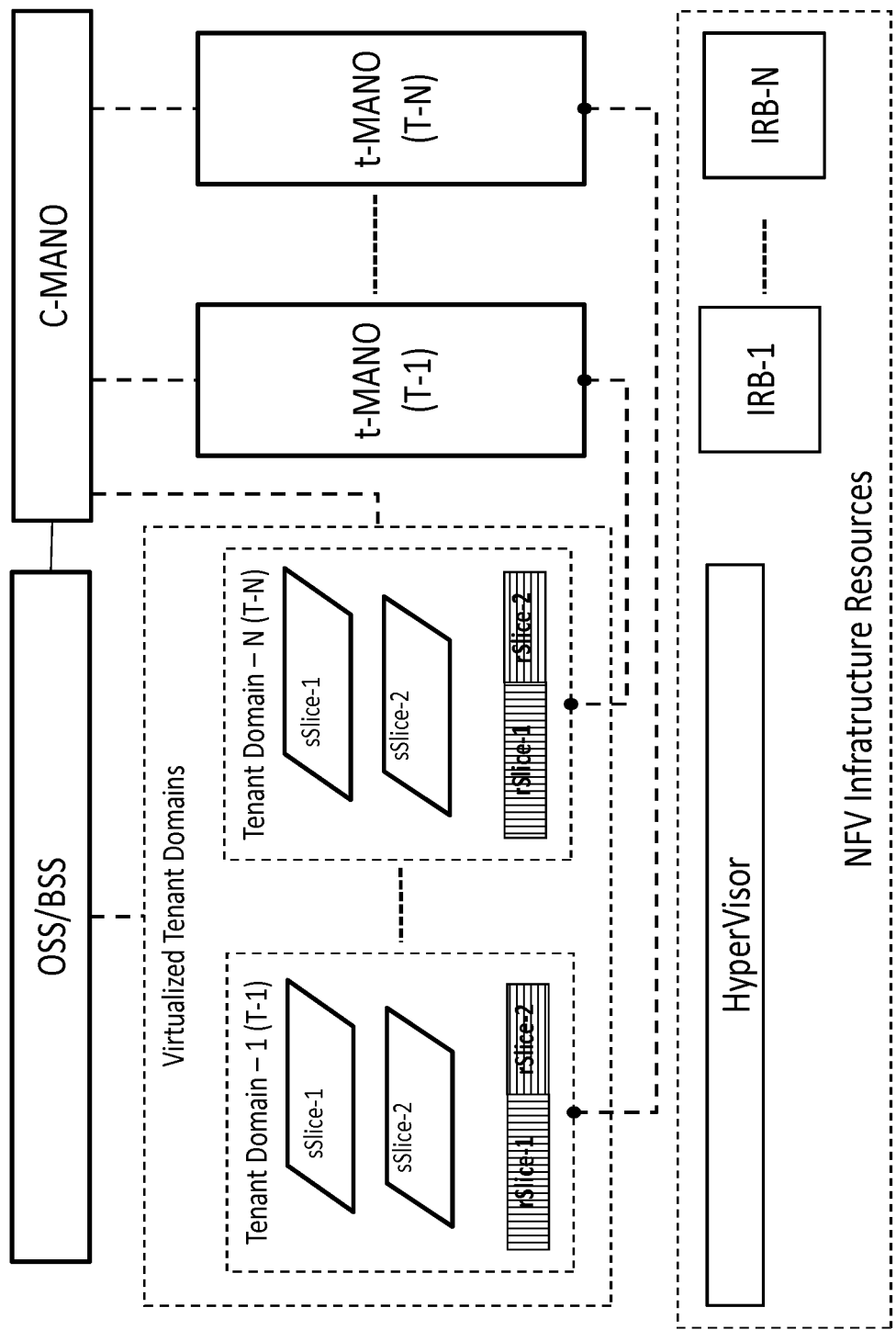
FIG. 7 is a schematic view illustrating the deployment and provisioning of a t-MANO instance as a container in accordance with an embodiment of the present invention.

The process flow described above in connection with FIGS. 5 and 6 relates to an embodiment where the t-MANO is provisioned by the c-MANO, as it would a VNF and/or a NS over the NFVI. According to an alternative embodiment of the present invention, the t-MANO system stack can be deployed and instantiated on a container rather than on VMs. This is shown in FIG. 7, where the t-MANO instances are deployed inside separate containers with dedicated Infrastructure Resource Block (IRB) assigned to the respective t-MANO instances. The IRB requirements will be the same as the rSlice-M but the method of resource dimensioning and allocation will be different. Once instantiated inside the containers, the t-MANO will be able to manage and orchestrate the resource/service slices of its respective tenants within an NFVI domain.

Both embodiments, i.e. implementing the t-MANO stack either as a Virtualized MANO Function (VMF) or as a container, have their respective inherent advantages and disadvantages that the VM systems and Containers have with respect to each other.

As will be easily appreciated by those skilled in the art, although not explicitly shown or described, a hybrid system can be deployed where some t-MANO stacks are deployed as VMFs (i.e., inside VMs) and where some other t-MANO stacks are deployed as containers.

Advantages and advancements achieved by embodiments of the present invention include:

1) Leverages the existing NFV-MANO system and architecture;
2) Enables each Tenant to have own MANO stack instead of a single MANO system stack being shared between multiple Tenants. Managing and Orchestration tasks of a MANO system is distributed;
3) A more resilient, scalable and fault tolerant method where a failure of either the c-MANO or t-MANO system stack will not result in a service shut-down. Failure of a c-MANO system stack will still enable the Tenant to manage its resource/service slices within the operational/functional scope of the t-MANO system;
4) In case of the failure of the t-MANO system stack, the c-MANO will take over the Tenant domain and provide MANO services till the t-MANO system stack is recovered:
5) Provide the Tenant the autonomy to manage and orchestrate its resource/service slices and implement own policies with minimum or no involvement of the c-MANO system;
6) Reduced processing load on the c-MANO;
7) Inherent ability for the t-MANO tenant to recursively provision t-MANO stacks for its respective tenants in a recursive manner.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a data communication network having a Network Function Virtualization Infrastructure (NFVI), the method comprising:
   by a Cloud Service Provider (CSP), providing a centralized Management and Orchestration (MANO), system that manages the NFVI and that orchestrates the allocation of resources needed by Network Services (NSs), and/or Virtualized Network Functions (VNFs), configured in the network,
   by the centralized MANO system and upon request from a tenant, allocating resources of the NFVI to the tenant and providing the tenant its own MANO instance for being employed by the tenant to implement the tenant's own policies independently from the centralized MANO framework provided by the CSP, wherein Management Level Agreements (MLAs), negotiated between the CSP and the tenant determine the scope of the tenant's autonomy over the tenant's MANO instance.

2. The method according to claim 1, wherein the tenant's MANO instance is realized as a virtualized function or as a container.

3. The method according to claim 1, wherein the centralized MANO system is given full administrative rights over the tenant's MANO instance.

4. The method according to claim 1, wherein the centralized MANO system monitors the usage of the tenant's MANO instance for MLA compliance.

5. The method according to claim 1, wherein the centralized MANO system provides services, features and/or capabilities to the tenant that are outside the MLA bounds of the tenant's MANO instance.

6. The method according to claim 1, wherein the tenant's MANO instance is instantiated in such a way that it enables the tenant to provide MLA bound MANO instances to other tenants.

7. The method according to claim 1, wherein the request from the tenant indicates to the centralized MANO system the required Virtualized Management Function (VMF) components, including a Network Function Virtualization Orchestrator (NFVO), a Virtualized Network Function Manager (VNFM), and/or a Virtualized Infrastructure Manager (VIM).

8. The method according to claim 1, wherein the request from the tenant specifies the tenant's required privileges to access specific MANO services, features and/or capabilities that the tenant requires from the tenant's MANO instance.

9. The method according to claim 1, wherein the CSP creates a MANO catalogue for the tenant's MANO instance based on the parameters indicated in the request from the tenant, wherein the MANO catalogue for the tenant's MANO instance includes a MANO descriptor file, a VMF Forwarding Graph (VMFFG), and a Virtual Link Descriptor (VLD).

10. The method according to claim 1, wherein the CSP creates a VMF catalogue for the tenant's MANO instance based on the parameters indicated in the request from the tenant, wherein the VMF catalogue for the tenant's MANO instance includes a VMF descriptor (VMFD) file.

11. The method according to claim 1, wherein a request for network resource allocation from the tenant is received via an Operations/Business Support System (OSS/BSS) of the data communication network or via a portal that provides a dedicated graphical user interface.

12. A data communication network having Network Function Virtualization Infrastructure (NFVI), servers, the network comprising:
   a centralized Management and Orchestrations (MANO) system provided by a Cloud Service Provider (CSP) that manages the NFVI and that orchestrates the allocation of resources needed by Network Services (NSs), and/or Virtualized Network Functions (VNFs), configured in the network, wherein the centralized MANO system includes one or more functional entities that are configured, upon request from a tenant, to:
   allocate resources of the NFVI to the tenant, and
   provide the tenant its own MANO instance for being employed by the tenant to implement the tenant's own policies independently from the centralized MANO system provided by the CSP, wherein Management Level Agreements (MLAs), negotiated between the CSP and the tenant determine the scope of the tenant's autonomy over the tenant's MANO instance.

13. The network according to claim 12, wherein the centralized MANO system comprises a Virtualized Management Function (VMF), a Network Function Virtualization Orchestrator (NFVO), and a Virtualized Network Function Manager (VNFM), wherein the NFVO is configured to:
   perform an MLA negotiation process with the tenant, and
   initiate instantiation and or configuration of VMFs for the tenant's MANO instance at the VNFM.

14. The network according to claim 12, further comprising a Virtualized Management Function (VMF) catalogue that is configured to maintain a VMF descriptor (VMFD) file that maintains the state information and/or MLA information of the tenant's MANO instance.

15. A Management and Orchestration (MANO) system, configured for deployment in the network according to claim 12.

* * * * *